(12) United States Patent
King et al.

(10) Patent No.: US 8,362,410 B2
(45) Date of Patent: Jan. 29, 2013

(54) SOURCE-INDEPENDENT BEAM DIRECTOR AND CONTROL SYSTEM FOR A HIGH-ENERGY ELECTROMAGNETIC RADIATION SOURCE

(75) Inventors: William B. King, Rancho Palos Verdes, CA (US); Chaunchy F. Mckearn, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 334 days.

(21) Appl. No.: 12/843,802

(22) Filed: Jul. 26, 2010

(65) Prior Publication Data

US 2012/0018614 A1 Jan. 26, 2012

(51) Int. Cl.
*G01J 1/20* (2006.01)
(52) U.S. Cl. .................. 250/201.9; 250/203.6
(58) Field of Classification Search .......... 250/201.9, 250/203.6, 203.1, 203.2, 206.1, 216, 221; 359/244–249, 399, 419–429, 601; 356/521, 356/451, 121, 124
See application file for complete search history.

(56) References Cited

U.S. PATENT DOCUMENTS

| | | | |
|---|---|---|---|
| 3,764,213 A | 10/1973 | O'Meara | |
| 5,018,835 A | 5/1991 | Dorschner | |
| 5,090,795 A | 2/1992 | O'Meara et al. | |
| 5,093,740 A | 3/1992 | Dorschner et al. | |
| 5,093,747 A | 3/1992 | Dorschner | |
| 5,126,869 A | 6/1992 | Lipchak et al. | |
| 5,237,166 A * | 8/1993 | Ito et al. | 250/201.1 |
| 5,253,033 A | 10/1993 | Lipchak et al. | |
| 5,694,408 A | 12/1997 | Bott et al. | |
| 6,809,307 B2 | 10/2004 | Byren et al. | |
| 7,583,425 B1 | 9/2009 | Williams | |
| 7,626,152 B2 | 12/2009 | King et al. | |

* cited by examiner

*Primary Examiner* — Que T Le
(74) *Attorney, Agent, or Firm* — Pierce Atwood LLP; Joseph M. Maraia (57) ABSTRACT

A high-energy beam is precompensated by a process including receiving a high-energy beam from a source and energy from a target. The target energy includes wavefront aberrations related to atmospheric and other external disturbances encountered along a distance separating the target. A correction signal is determined responsive to the high-energy beam and the target energy. The correction signal is also configured to pre-compensate for wavefront aberrations related to the atmospheric and other external disturbances and to cancel aberrations introduced by the adaptive optics techniques. A wavefront of the outcoupled high-energy beam is adjusted responsive to the determined correction signal. A beam control system includes three adaptive optics servo loops and an aperture-sharing element. The arrangement is adapted to self-cancel internal optical-path-difference errors in the outcoupled beam and to pre-compensate the outcoupled beam according to a conjugate of the wavefront aberrations related to atmospheric and other external disturbances.

21 Claims, 5 Drawing Sheets

SOURCE-INDEPENDENT BEAM DIRECTOR AND CONTROL SYSTEM FOR A HIGH-ENERGY ELECTROMAGNETIC RADIATION SOURCE

TECHNICAL FIELD

Various embodiments are described herein relating generally to optics and more particularly to systems and methods for directing and correcting high-power beams of electromagnetic energy.

BACKGROUND

Directed energy weapons and specifically high-energy laser (HEL) weapons are being considered for variety of military applications with respect to a variety of platforms, e.g., spaceborne, airborne and land based systems to name a few. These weapons generally involve the use of the laser or other source of a high-power beam to track and destroy a target. To achieve mission objectives, directed energy weapons must be accurately steered and optimally focused. Steering involves line-of-sight control and focusing, with respect to HEL weapons, involves wavefront error correction. Currently, wavefront error correction is typically achieved using adaptive optics. For example, use of adaptive optics in laser beam control requires placing one or more deformable mirrors within the highest intensity portion of the beam path. The conventional deformable mirror is typically a large element with a thin face sheet and a number of piezoelectric actuators. Actuators are located behind the face sheet and are electrically driven to push and pull on the surface thereof to effect the deformation required to correct wavefront errors in an outgoing beam. The size of the active region of the deformable mirror must accommodate the full size of the high-power laser beam in the high-power Coudé path prior to expansion via an output telescope.

In addition, one or more fast-steering mirrors may be used to correct for tilt and direct the line-of-sight. A coarse gimbal may be employed to correct for line-of-sight errors as well. A plurality of wavefront sensors are typically employed along with an Aperture Sharing Element (ASE). The ASE allows a single shared aperture to be advantageously used for both the low-power sensors and the high-power output laser beam, ensuring that the path through the atmosphere taken by the high-power beam is the same as that taken by the wavefront sensor and that the correction applied to the shared atmospheric path is optimal for the high-power beam. In at least some high-power applications, the ASE includes both reflective and refractive properties. Placement of the ASE in the path of the high-power beam subjects it to errors arising from distortion of the optical properties of the ASE caused by non-uniform heating. In some applications, ASE errors observed by the low-power sensors differ from those encountered by the high-power beam, limiting a system's ability to correct for such so-called non-common path errors.

In U.S. Pat. No. 5,694,408, issued Dec. 2, 1997, the entire teachings of which are incorporated herein by reference, Bott, Rice, and Zediker appear to disclose a scheme which allows the deformable element to be placed in the low intensity region between a master oscillator and an array of fiber power amplifiers. The approach is to pre-distort the phase of the oscillator beamlets after separation in a distribution network and before injection into the fiber amplifier array, such that the pre-distortion corrects both the position error between the individual fibers and optical aberrations in the atmosphere. However, this scheme is practical only with a coherently-combined array of single-mode fiber amplifiers, as each fiber channel is correctable in piston only, not high order. Also, this scheme is not applicable to multi-mode laser media such as large core fiber amplifiers or bulk media lasers as contemplated for weapon class HEL devices and may not be scaleable to high-power levels due to random, high frequency phase noise caused by pump-induced temperature fluctuations within the fibers.

In U.S. Pat. No. 5,090,795, issued Feb. 25, 1992, the entire teachings of which are incorporated herein by reference, O'Meara and Valley appear to disclose several related schemes for using a liquid crystal light valve (LCLV) in a self-correcting adaptive optics system. This approach, however, places the LCLV in the high-power beam path and is therefore limited by the damage susceptibility of the liquid crystal material.

The need was addressed by U.S. Pat. No. 6,809,307 issued Oct. 26, 2004 to Byren et al. and entitled "System and Method for Effecting High-Power Beam Control With Adaptive Optics in Low Power Beam Path," hereinafter the 'Byren' patent, the entire teachings of which are incorporated herein by reference. In the Byren patent, a beam control system and method that utilizes the wavefront reversal property of non-linear optical phase conjugation to permit incorporation of a liquid crystal Optical Phased Array (OPA) within low-power legs of the beam control system is disclosed and claimed. The heart of the cited invention is the use of deformable optical elements in the low-power path of a High-Energy Laser (HEL) beam control subsystem to correct for atmospheric turbulence, aero-optic effects, and HEL beam path aberrations.

The Byren patent is adapted for use with HEL devices incorporating phase conjugating mirrors. Unfortunately, requiring that HEL sources include phase conjugating mirror impose limitations on the types of HEL devices (i.e., an inability to use those without phase conjugate mirrors).

Hence, a need remains in the art for a system or method for a fast, large-stroke, high spatial bandwidth or high order system or method for effecting wavefront correction of a high-power beam without limitation as to selection of the high-energy source.

SUMMARY

The need in the art is addressed by the beam control system and method of the present invention. The invention is adapted for use with a system for illuminating a target with a first beam of electromagnetic energy. Several embodiments are disclosed herein. In a preferred embodiment, the inventive system includes a first mechanism for receiving a first beam of electromagnetic energy; a second mechanism for detecting aberrations in the first beam; a third mechanism responsive to the second mechanism for generating a second beam that is at least partially compensated with respect to the aberrations detected; and a fourth mechanism for amplifying the second beam to provide an output beam.

In one aspect, the invention relates to a beam control system, including first, second and third adaptive optics servo loops, and an aperture-sharing element. The first adaptive optics servo loop is positioned to receive a high-energy beam of electromagnetic energy, introducing a first internal optical-path-difference error. The second adaptive optics servo loop is positioned to receive electromagnetic energy from a target, the received electromagnetic energy comprising wavefront aberrations related to atmospheric and other external disturbances, and introducing a second internal optical-path-difference error. The aperture-sharing element is positioned in a respective optical path of each of the first and second adaptive optics servo loops, contributing different optical-path-difference errors to each of the first and second internal optical-path-difference errors. The aperture sharing element is further adapted to (i) obtain a low-energy beam sample of the high-energy beam and (ii) outcouple the high-energy beam.

The third adaptive optics servo loop is arranged in electromagnetic communication with each of the first and second adaptive optics servo loops. The arrangement of servo loops is adapted to self-cancel substantially all internal optical-path-difference errors in the outcoupled high-energy beam and to pre-compensate the outcoupled high-energy beam according to a conjugate of the wavefront aberrations related to atmospheric and other external disturbances.

In another aspect, the invention relates to a process for pre-compensating a high-energy beam including receiving a high-energy beam of electromagnetic energy from a source and electromagnetic energy from a target, including wavefront aberrations related to atmospheric and other external disturbances encountered along a distance separating the target. A correction signal is determined by adaptive optics techniques. The correction signal is responsive to the high-energy beam and to the electromagnetic energy received from the target. The correction signal is also configured to pre-compensate for wavefront aberrations related to the atmospheric and other external disturbances and to cancel aberrations introduced by the adaptive optics techniques. A wavefront of the high-energy beam of electromagnetic energy is adjusted responsive to the determined correction signal and outcoupled.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of preferred embodiments of the invention follows.

1. Conventional HEL Beam Control Architectures

Figure 1:
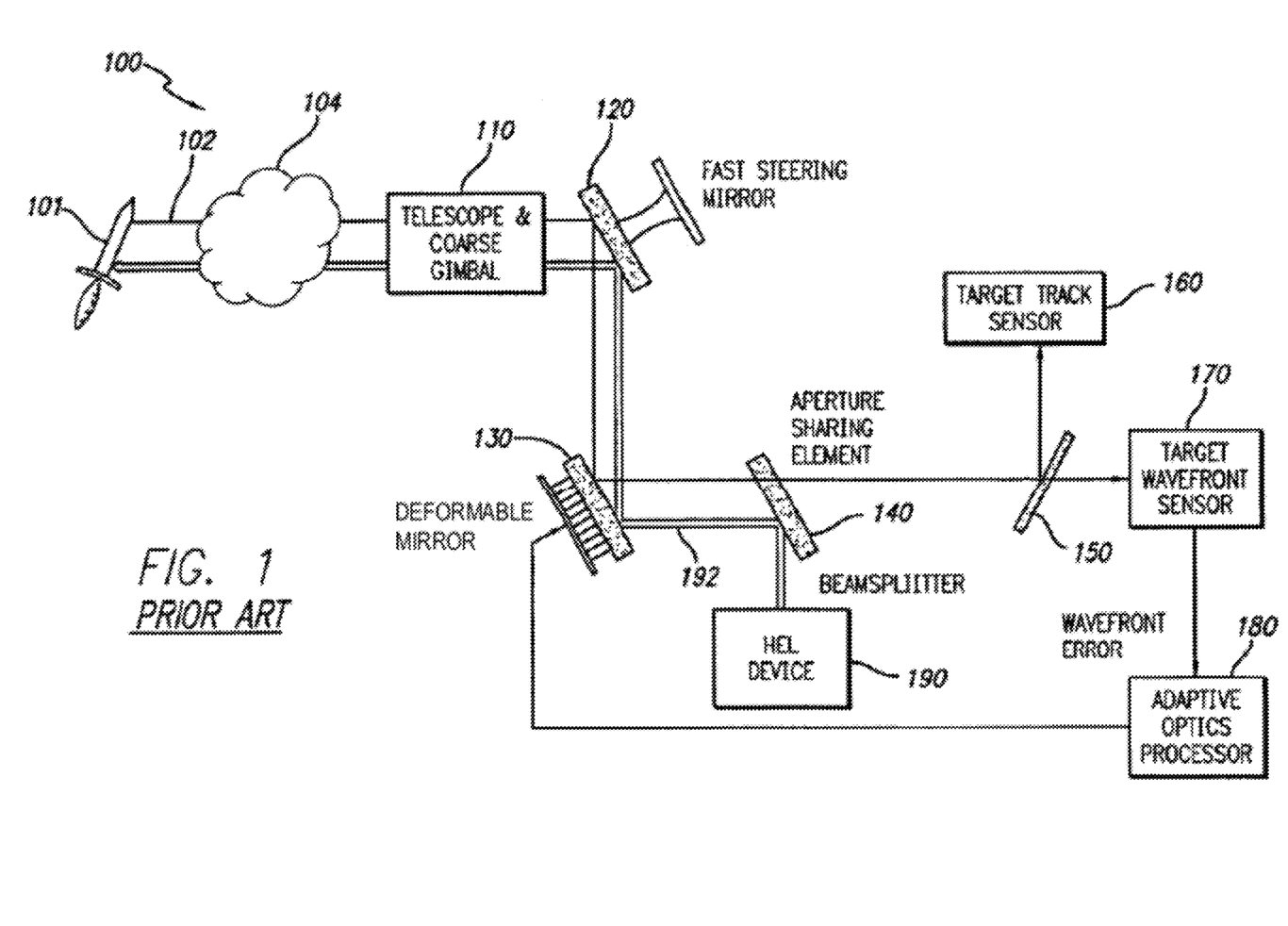
FIG. 1 is a simplified optical schematic of a conventional HEL beam control architecture.

A simplified optical schematic of a conventional High-Energy Laser (HEL) beam control architecture 100 is shown in FIG. 1. A HEL beam director, generally consisting of a Telescope and multi-axis coarse gimbal 110, is commanded to the line-of-sight of a target 101 based on an external cue (acquisition or coarse tracking system not shown). A target track sensor 160 acquires the target and begins to close a track servo loop (not shown) maintaining line-of-sight to the target 101. Optical aberrations along the line-of-sight caused by atmospheric turbulence 104 along the path to the target 101 and the aero-optic effects due to the boundary layer surrounding the beam director turret (moving platforms only, not shown) distort the image of the target 101, causing relatively poor tracking performance. The target wavefront sensor 170 measures this wavefront (or phase) distortion, and an adaptive optics processor 180 closes an adaptive optics servo loop around a Deformable Mirror (DM) 130 effectively nulling the wavefront (or phasefront) error caused by the atmosphere. The target wavefront sensor 170 can employ an active sensor with a beacon illuminator (not shown) to measure either sub-aperture tilts (Shack-Hartmann sensor) or optical phase (lateral shearing interferometer or transform wavefront sensor). The target wavefront sensor 170 can also employ imaging sensors at different focal positions to infer phase from the passive target imagery using "phase diversity" techniques. The adaptive-optics servo loop corrects the aberrations along the target path allowing the tracker to operate at full performance. It also corrects the portion of the beam path for the High-Energy Laser (HEL) Device 190 from the Aperture Sharing Element (ASE) 140 to the target 101, enabling high beam intensity (high Strehl ratio) and low beam wander (low angular jitter) on the target 101. Unfortunately, the adaptive-optics servo loop does not correct for non-common path errors in the ASE 140 or distortions in the HEL beam path from the HEL device 190 to the ASE 140.

For most adaptive optics applications, it is advantageous to place the deformable elements and wavefront sensors at pupil points within the optical path. This ensures good mapping of the sensed wavefront errors to the actuator locations of the deformable mirror. Pupil relay or reimaging optics, which are not shown in the figure, may therefore be employed in the low-power beam path to locate the pupil at the Deformable Mirror 130 surface to the target wavefront sensor 170 for best adaptive optics correction performance.

Fast steering mirrors 120 may be used in conjunction with a stable platform and internal active auto-alignment system (not shown) to provide wide bandwidth correction for line-of-sight disturbances caused by imperfect isolation of base motion, structural compliance, gimbal bearing runout, and gimbal axis non-orthogonality. The fast steering mirrors 120 can also be used to off-load tilt corrections from the DM 130, thereby minimizing the stroke requirement of the DM actuators.

The theory of operation and description of key components for a conventional HEL beam control system may be found in several published references, including:

1. Tyson and Ulrich, "Adaptive Optics," The Infrared and Electro-Optical Handbook, Volume 8, Chapter 2, ERIM, Ann Arbor, Mich., pp. 165-237, (1993) and
2. Golnik, "Directed Energy Systems," The Infrared and Electro-Optical Handbook, Volume 8, Chapter 5, ERIM, Ann Arbor, Mich., pp. 403-480, (1993).

Figure 2:
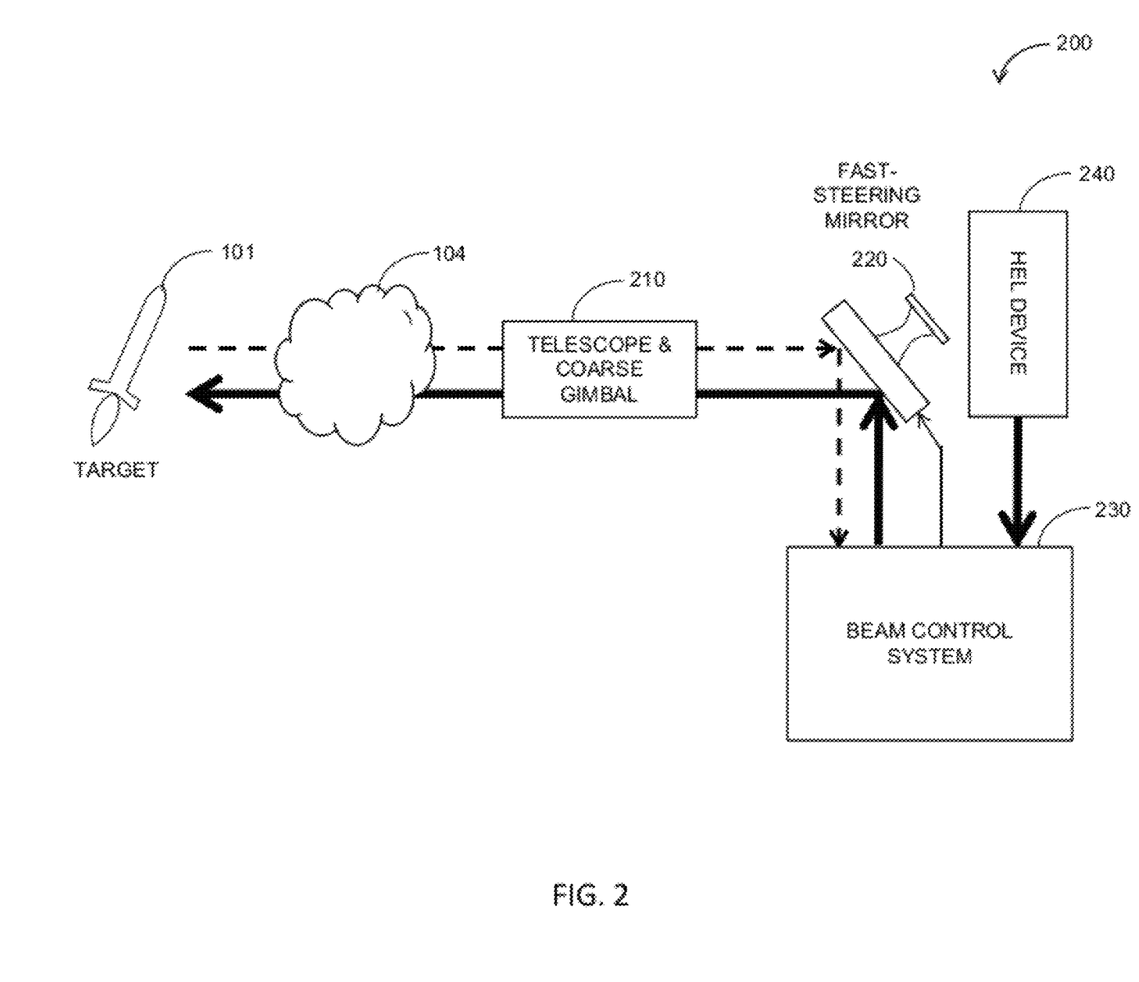
FIG. 2 is a simplified optical schematic of an electromagnetic energy beam control architecture in accordance with an illustrative embodiment of the present invention.

A simplified block diagram of FIG. 2 shows an optical schematic of an illustrative embodiment of a high-energy electromagnetic beam control system architecture 200 implemented in accordance with the teachings of the present invention. As in the conventional system depicted in FIG. 1, the output of a high-energy electromagnetic source, such as a HEL device 240, is provided to a high-energy input of beam control system 230. A high-energy output beam is directed out of the beam control system 230 through a telescope 210 toward a target 101. The telescope 210 uses coarse gimbals to point the high-energy beam toward the target 101 based on an external cue. The system also includes one or more fast-steering mirrors 220 positioned along an optical path of the high-energy output beam, between the telescope 210 and the beam control system 230.

As will be described in more detail below, the beam control system 230 receives electromagnetic energy reflected from the target 101 and corrects for substantially all optical path differences between the high-energy source 240 and the target. Advantageously, such corrections are applied to the high-energy beam in real-time allowing the beam to be focused onto the target 101 with diffraction-limited precision. Use of the term "real-time" allows for processing delays that are substantially negligible compared to variations in optical path delay (e.g., a processing delay on the order of a millisecond would be acceptable for atmospheric disturbances).

Figure 3:
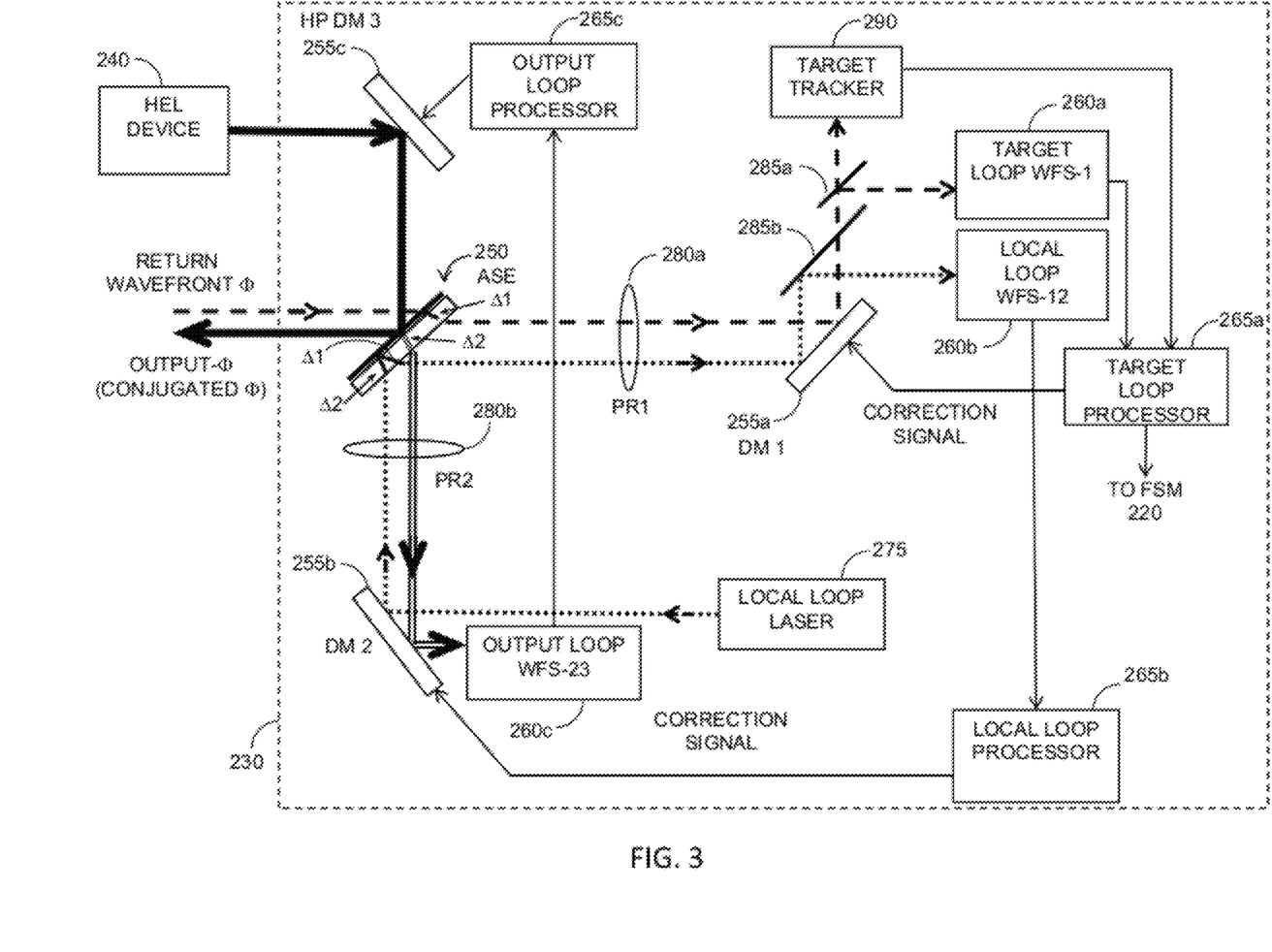
FIG. 3 is a more detailed block diagram of an illustrative embodiment of an electromagnetic energy beam control system architecture of FIG. 2.

A simplified block diagram of FIG. 3 shows an optical schematic of an illustrative embodiment of a high-energy electromagnetic beam control system 230 of FIG. 2 implemented in accordance with the teachings of the present invention. The beam control system 230 includes an ASE 250 positioned along an optical path of return energy reflected from the target 101 (FIG. 2). In some embodiments, the ASE 250 is a beam splitter. Alternatively or in addition, the ASE 250 can include a holographic grating, for example, configured to sample a portion of the high-energy beam. Some ASE devices, such as traditional beam splitter architectures are inherently poly-chromatic. The return target energy is transmitted through the ASE 250 toward a first wavefront correcting element 255a, which, in turn, directs the return target energy to a first wavefront (or phasefront) sensor 260a, sometimes referred to as a target-loop wavefront sensor 260a. It should be noted that the processing described herein is performed on collimated beams. The return beam from the target, after emerging from the telescope, is collimated. The target-loop wavefront sensor 260a provides a first error signal indicative of distortion in the wavefront of the return target energy, as altered by transmission through the ASE 250. A first adaptive optics processor 265a, sometimes referred to as a target-loop processor, receives the first error signal and in response provides a first correction signal to the first wavefront correcting element 255a in a closed-loop arrangement.

The beam control system 230 also includes a local source of electromagnetic radiation (e.g., a local laser) 275. Preferably, the local laser 275 provides a high quality output. More preferably, the local laser 275 provides an output having diffraction-limited quality. Additionally, there is no particular power requirement for the local laser 275. Thus, the local laser 275 can be a low-power device. Output of the local laser 275 is directed toward a second wavefront correcting element 255b. Output of the local laser 275 is further directed from the second wavefront correcting element 255b toward a rear surface of the ASE 250. The local laser output is refracted through a rear surface of the ASE 250, reflected off of a back side of a front reflecting surface and refracted back through the ASE 250 a second time, exiting from the rear surface of the ASE 250, ultimately directed toward the first wavefront correcting element 255a. The local laser output is directed from the first wavefront correcting element 255a, toward a second wavefront sensor 260b, sometimes referred to as the local-loop wavefront sensor. The local-loop wavefront sensor 260b provides a respective error signal indicative of distortion in a wavefront of the local laser output, as altered by the first and second wavefront correcting elements 255a, 255b and by the ASE 250. A second adaptive optics processor 265b, sometimes referred to as the local-loop processor, receives the error signal from the local-loop wavefront sensor 260b and in response thereto, generates a respective correction signal, providing the correction signal to the second wavefront correcting element 255b in a closed-loop arrangement.

The beam control system 230 further includes a third, high-power wavefront correcting element 255c positioned in an optical path of the HEL output beam. The HEL output beam as adjusted by the third wavefront correcting element 255c and directed toward a front, reflecting surface of the ASE 250. The ASE 250 reflects a high-power portion of the HEL output beam toward the target 101. Advantageously, the ASE 250 allows a comparatively small portion of the HEL output beam to pass through the ASE 250, referred to as a low-power, HEL reference beam. A ratio of high-power HEL output to low-power HEL reference beams can be controlled by optical properties of the ASE 250. In at least some embodiments, the high-to-lower power ratio is at least about 1,000, ensuring that only low-power beams are processed internally by the beam control system 230. The low-power HEL reference beam transmitted through the ASE 250 is directed toward the second wavefront correcting element 255b. The low-power HEL reference beam as adjusted by the second wavefront correcting element 255b is further directed from the second wavefront correcting element 255b toward a third wavefront sensor 260c, sometimes referred to as the output loop wavefront sensor. The output loop wavefront sensor 260c provides a respective error signal indicative of distortion in a wavefront of the HEL output beam, as altered by the second and third wavefront correcting elements 255b, 25c and by the ASE 250. A third adaptive optics processor 265c, sometimes referred to as the output loop processor, receives the error signal from the third wavefront correcting element 255c and in response thereto, provides a respective correction signal to the third wavefront correcting element 255c in a closed-loop arrangement.

In at least some embodiments, the beam control system 230 includes first pupil-relay, or re-imaging, optics 280a positioned along an optical path between the rear surface of the ASE 250 and the first wavefront correcting element 255a. The first pupil-relay optics 280a are used to relay an optical pupil of the telescope 210 (FIG. 1) onto the first wavefront correcting element 255a, and ultimately onto the target loop wavefront sensor 260a. Alternatively or in addition, the beam control system 230 includes second pupil-relay, or re-imaging, optics 280b positioned along an optical path between the rear surface of the ASE 250 and the second wavefront correcting element 255b. The second pupil-relay optics 280b are used in combination with the first pupil relay optics 280a to relay the optical pupil of the second wavefront correcting element 255b onto the first wavefront correcting element 255a and ultimately onto the local-loop wavefront sensor 260b. In at least some embodiments, such as the illustrative example of FIG. 3, the second pupil relay optics 280b are also used to relay the optical pupil of the third, high-power wavefront correcting element 255c onto the second wavefront correcting element 255b and ultimately onto the output wavefront sensor 260c. Beneficially, all of the pupil relay optics 280a, 280b as well as two of the three deformable mirrors (i.e., first and second deformable mirrors 255a, 255b) can be implemented with low-power devices. It is generally necessary for no more than one for the deformable mirrors (e.g., the third deformable mirror 255c of the illustrative embodiment) to accommodate the high-power electromagnetic beam. Limiting requirements for high-power devices in such a manner simplifies physical realizations, along with opportunities for cost savings.

In at least some embodiments, the beam control system 230 includes a first beam director 285a positioned along an optical path between the first wavefront correcting element 255a and the target loop wavefront sensor 260a. For example, the first beam director 285a can include a reflective surface, reflecting at least a portion of the return target energy toward the target-loop wavefront sensor 260a. In at least some embodiments, the first beam director 285a reflects a first portion of the return target energy and allows a second portion of the return target energy to pass through. Such a device can be referred to generally as a beam splitter as is known to those skilled in the art. For example, the beam splitter may include a partially mirrored surface selectively reflecting first portion and allowing the second portion to pass through.

In at least some embodiments, the beam control system 230 includes a second beam director 285b positioned along an optical path between the first wavefront correcting element 255a and the local-loop wavefront sensor 260b. For example, the second beam director 285b can include a reflective surface, reflecting at least a portion of the local laser output beam toward the second wavefront sensor 260b, while allowing other radiation from the first wavefront correcting element 255a to substantially pass through. In at least some embodiments, the second beam director 285b reflects electromagnetic energy of a first wavelength, while allowing electromagnetic energy of a second wavelength to substantially pass through. Examples of such devices include dichroic filters. In the illustrative embodiment, the wavelength of the local laser output differs from the wavelength of the return target energy, such that a dichroic filter can be used as the second beam director 285b. Accordingly, the second beam director 285b can be placed along an optical path of an output of the first wavefront correcting element, directing each of the return target energy and the local laser output to a different respective wavefront sensor 250a, 250b.

The high-energy source of electromagnetic radiation 240 can be selected from radio frequency sources (e.g, microwave or millimeter wave sources, travelling wave tubes, klystrons, magnetrons, solid state devices, such as Gunn diodes), infrared sources, optical sources, including visible and ultraviolet, and black-body sources. In some embodiments, the source is coherent, such as a maser and a laser. The beam control system 230 is configured to accommodate high-energy source of a first wavelength, or first wavelength band. Preferably, such wavelength or wavelength band is in an eye-safe region. For example, the beam control system 230 can be configured to operate with a high-energy source 240 operating in the 1.03 µm, 2.06 µm, or even higher. The target illuminating source (not shown) can be configured to operate at 1.55 µm or 1.6 µm. Preferably, the target illuminating source operates at wavelengths or wavelength bands known to be substantially "eye-safe."

The deformable mirrors described herein 255a, 255b, 255c are not necessarily identical. In particular, the third deformable mirror 255c is a high-power device, such as high-power deformable minor model no., IWCHD97-S4 Commercially available from Zinetics. Low-power deformable mirrors, such as the first and second deformable mirrors 255a, 255b can include Piezoelectric Deformable Mirrors (PDM) and Micro-machined Membrane Deformable Mirrors (MMDM). An example of such a suitable device includes model no. OKO-PDM50MM79CHANNEL, commercially available from Flexible Optical B.V., of the Netherlands (www.okotech.com). It should be appreciated that other deformable optical elements can be used as wavefront correcting elements, including but not limited to traditional deformable minors, spatial light modulators, liquid crystal light valves, and a variety of micro electro-mechanical systems (MEMS) without departing from the scope of the present teachings.

The wavefront sensors 260a, 260b, 260c (generally 260) can be selected from phase derivative sensors, such as Shack-Hartmann wavefront sensors; wavefront curvature sensors; interferometers, such as shearing interferometers; and phase second derivative sensors, such as pyramid wave front sensors. Currently available sensors, such as Shack-Hartmann sensors, are fast, simple and available. Unfortunately, such devices are currently prone to breaking down with larger aberrations. To extend ranges of operation, such devices can be combined with power-in-the bucket optimization. In at least some embodiments, a hybrid sensor methodology is used, for example, based on a combination of wavefront sensing and "power-in-the bucket" optimization. For example, Zinetics provides a Shack-Hartmann sensor, plus a pinhole to measure power in the pinhole, tied-in with a suitable algorithm for optimizing.

The adaptive optics processors 265a, 265b, 265c (generally 265) can include a general purpose computer or microprocessor programmed to respond to the wavefront error signal and provide a correction signal to the optical phased array in response thereto. In some embodiments, the adaptive optics processors 265 can be implemented as dedicated, special purpose processors. In some embodiments, a respective adaptive optics processors 265 is provided for each adaptive-optics servo loop 235a, 235b, 235c (generally 235). Alternatively, one or more of the adaptive optics processors 265 can share common elements. In some embodiments, a single adaptive optics processor 265 is provided for all three adaptive-optics servo loops 235. Processing related to target tracking can be implemented on a dedicated processor (not shown). Alternatively, processing related to target tracking can be implemented on one or more of multiple adaptive optics processors 265.

The local source of electromagnetic radiation 275 can be selected from radio frequency sources (e.g, microwave or millimeter wave sources), infrared sources, optical sources, including visible and ultraviolet, and black-body sources. In some embodiments, the source is coherent, such as a maser and a laser. In at least some embodiments, the local source 275 provides a low-power output, having diffraction limited beam quality than the high-energy source and/or a source illuminating the target. For example, the local source 275 can be configured to operate at about 0.85 µm or 1.06 µm with the high-energy and target illuminating sources operating in the other exemplary bands described above.

The beam control system 230 measures substantially all wavefront optical path difference (OPD) errors between the target 101 (FIG. 2) and the high-energy source, in this instance, HEL device 240. In the illustrative embodiment, the OPD errors are essentially collected by multiple wavefront sensors 250a 250b, 250c (generally 250) whose outputs, including a measure of error, are used to adjust respective deformable mirrors 255a, 255b, 255c (generally 255). Target wavefront sensing is obtained by sending out a beam from a separate target illuminator (not shown in the diagram) that reflects off of the target, at least a portion of which returns to the beam control system 120. In at least some embodiments, the separate target illuminator includes a laser.

Energy returning from the target, shown as a dashed line and labeled "RETURN WAVEFRONT" carries all OPD errors due to atmospheric and other external disturbances incurred between the target 101 and the beam control system 230. For reference, these OPD errors are labeled "φ." As the target return energy, or beam, enters the beam control system 230, it encounters additional errors associated with the beam control system 230 itself. For example, in the illustrative embodiment, the target beam incurs additional wavefront aberration, or error resulting from refraction of the beam through the ASE 250. Namely, such addition error can result from refraction error of the ASE 250 ($\Delta 1$), from distortion induced by the first pupil relay optics 280*a* (PR1), and from distortion of a faceplate of the first wavefront correcting element 255*a*, in this instance a low-power deformable mirror (DM1). The reflected target return next passes through the dichroic filter 285*a* and is then divided at the beam splitter 285*a*, a first divided part going to a target tracker 290 and the other divided part going to a first wavefront sensor 260*a*. Outputs from the target tracker 290 and the first wavefront sensor 260*a* are directed to the first adaptive optics processor 265*a* in a closed-loop arrangement.

In at least some embodiments, the target loop adaptive optics processor 265*a* provides at least two functions. First, the target loop adaptive optics processor 265*a* provides a steering signal, responsive to the first divided part of the reflected target return. The steering signal can be sent to one or more fast-steering mirrors (e.g., fast steering mirror 220 of FIG. 2) to control the one or more fast steering mirrors 220 to correct the incoming target return in tip/tilt, reducing jitter of both the target return beam and the high-energy outgoing beam, for example, when reflected from the same fast steering mirror 220.

A second function of the target loop adaptive optics processor 265*a* is to provide a correction signal to the first deformable minor 255*a*. As the mirror 255*a* distorts due to the correction signal, the wave front errors presented to the target tracker 290 and the first wavefront sensor 260*a* are driven to zero. Such action can be accomplished by servo-control techniques, such as a null-seeking servo. Preferably, embodiments such as the null-seeking servo do not require precise calibration of the deformable mirror's stroke. Consequently, the target 101 becomes better defined and the steering signals presented to the fast steering mirror 220 become more accurate. In at least some embodiments, some or all of the adaptive optics servo loops described herein are operated on-null, sometimes referred to as null-seeking. When properly registered and properly calibrated, the self-correcting nature of such feedback loops act to null the phase errors at each respective wavefront-sensing element, thereby producing a corrected wavefront. Operation of such feedback loops are self-calibrating in that they always respond by returning to a null value.

The ASE 250 introduces non-common optical path difference (OPD) errors, particularly for high-power applications in which local heating of the ASE 250 is induced by the high-energy beam. Such errors arise from distortion of the optical properties of the ASE 250, for example, caused by non-uniform heating of the coatings and optical substrate due to finite absorption of the HEL beam power. One type of distortion is warping of the reflecting surface of the ASE 250, causing distortion of the reflected HEL beam phasefront. Another type of distortion is refractive in nature, resulting from thermally-induced optical path length differences across the ASE aperture. One or more of these OPD errors distort the signal from the target as it is transmitted by the ASE 250 to the target tracker 290 and first wave front sensor 260*a*. In the illustrative embodiment, the error signals provided by the target tracker 290 and first wavefront sensor 260*a* do not "see" the warped-surface distortion, and the HEL beam does not "see" the refractive distortion, hence the term "non-common path." Alternatively or in addition, refraction through the ASE 250 in a vertical direction differs from refraction in a horizontal direction also contributing to "non-common path" differences.

The local-loop laser 275 is positioned to propagate a local reference beam off the second wavefront correcting element 255*b*, in this instance, a second low-power deformable mirror. This local reference beam approaches the rear surface of the ASE 250, passing through a transmissive portion of the ASE 250, reflecting off of the back side of the front reflective surface and passing again through the transmissive portion, exiting the ASE 250 from its rear surface. Accordingly, the local reference beam samples OPDs created by ASE growth and bending.

The reflected local loop laser beam now contains OPD errors, $\Delta 1$ and $\Delta 2$, from the ASE 250, wavefront aberrations resulting the pupil relay optics 280*a*, 280*b* (PR1) and (PR2), and also any errors introduced by the second deformable mirror 255*b* (DM2). As the local-loop laser beam bounces off DM1, it also picks up the faceplate distortions of the first deformable mirror 255*a* (DM1). However, due to the action of the first wavefront sensor 260*a* and the target-loop adaptive optics processor 265*a*, the first deformable mirror's local distortion (DM1) is the conjugate of the OPD errors resulting from the target return wavefront as it passed through intervening atmosphere 104, and other external aberrations as may be incurred by the beam director's window (e.g., from the telescope 210) any other intermediate optical elements in the optical train between the target and the beam control system (represented as other external aberrations 106), The total aberrations resulting from non-beam control system contributors, are collectively referred to as $\Phi$. the ASE 250, and any pupil relay optics 280*a* (PR1). A reference beam is split off by a low-power beam splitter or otherwise directed to the local-loop wavefront sensor 260*b*, upon which the local reference beam, altered by the intervening components as described herein, is sampled.

Similar to the operation of the first wavefront sensor 260*a*, the second wavefront sensor 260*b* measures OPD's of the local loop laser beam and sends correction signals to the local loop adaptive optics processor 265*b*. The local loop adaptive optics processor 265*b* then adjusts the reflective surface of the second deformable mirror 255*b* so as to minimize the reference beam's OPD's as they are presented to the local-loop wavefront sensor 260*b*. As described above for the target loop, the corrective process of the second, local loop can be accomplished by servo techniques, such as a null-seeking servo.

The result of such an approach is that the surface distortion of the second deformable mirror 255*b* is a phase conjugate of the surface of the first deformable mirror 255*a*, along with OPD's introduced by any intervening elements encountered along the optical path of the local loop (i.e., $\Delta 1$, $\Delta 2$, PR1 and PR2 in the illustrative embodiment—$\Delta 1$ relating to aberrations incurred during a substantially horizontal pass through the ASE 250, and $\Delta 2$ relating to aberrations incurred during a substantially vertical pass through the ASE 250). The surface of the first deformable mirror 255*a* (DM1), in turn, is a phase conjugate of the OPD's that occur between the target 101 and the first wavefront sensor 260*a* (i.e., $\Phi$, $\Delta 1$, and PR1). Due to the resulting double conjugation, the surface of the second deformable mirror 255*b* reproduces the OPD's encountered between the target 101 and the beam control system 230 (i.e., $+\Phi$) along with a combination of the other OPD's introduced by the target and local loops. As will be described in more detail below, cross-linking of the target and local loops in the manner described herein leads to a favorable cancellations of at least some of the other OPD's.

Beneficially, a conjugate of the second deformable mirror's 255*b* distortion to the HEL's output beam as well as a conjugate of the HEL's wavefront OPD's can be accomplished by letting a small fraction or sample of the HEL's output beam, referred to herein as a low-power output sample, pass through the ASE 250 and reflect off of the second deformable mirror 255b. The low-power output sample reflected beam sampled at the third wavefront sensor 255c, sometimes referred to as the output wavefront sensor, contains the OPD's of the HEL 240 as well as those OPD's that occur between the target 101 and the first wavefront sensor 255a. The third wavefront sensor 255c detects these OPD's and sends correction signals to the output loop adaptive optics processor 265c, which adjusts the third, high-power deformable mirror 255c so as to minimize the OPD's presented to the third wavefront sensor 255c. With such an approach, the surface of the third, high-power deformable mirror 255c is adjusted so as to include a conjugate displacement of the surface of the second deformable mirror 255b, along with OPD's introduced by any intervening elements encountered along the optical path of the output loop and those related to the HEL source (i.e., $\Delta 2$, PR2 and W in the illustrative embodiment). Beneficially, cross-linking of the output and local loops in the manner described herein leads to further favorable cancellations of other system OPD's, such that surface of the third, high-power deformable mirror 255c includes the conjugate displacement of all of the target-to-beam-control-system errors (i.e., $\Phi$) as well as the OPD errors of the HEL 240 (i.e., W) and the beam control system 230. Quite elegantly, the multi-looped, cross-linking architecture of described herein, such as the exemplary beam control system 230, leads to cancellation of all other OPD's introduced by elements of the beam control system 230. Consequently, the HEL beam reflected off the ASE 250 propagates toward the target 101 with all of the HEL OPD errors and all of the intervening bean control system 230 and atmospheric 104 and other external errors, e.g., due to the telescope 110 (FIG. 1) corrected, allowing the HEL beam to be focused onto the target 101 with diffraction-limited precision. It is also important to recognize that such results are achievable without limitation as to the particular choice of HEL source 240, with the beam control system 230 correcting perturbations introduced by the HEL 240 and between the HEL 240 and the beam control system 230.

More particularly, the beam control system 230 is configured to effectively self-cancel all internal aberrations, including non-common path aberrations as well as wavefront aberrations associated with the high-energy source [other external aberrations refer to aberrations incurred between the target 101 and the beam control system 230, including, for example, aberrations due to the external telescope 210, external optical train, etc. . . . ]. Accordingly, the corrected high-energy beam exits the beam control system 230 (i.e., reflects off of the ASE 250), pre-compensated with respect to the actual atmospheric and other external aberrations between the source and the target 101 (i.e., including aberrations corresponding to a phase conjugate of the atmospheric and other external aberrations). Consequently, the pre-compensated, high-energy beam arrives at the target 101 as a beam that can be focused to a near-diffraction-limited spot.

Figure 4A:
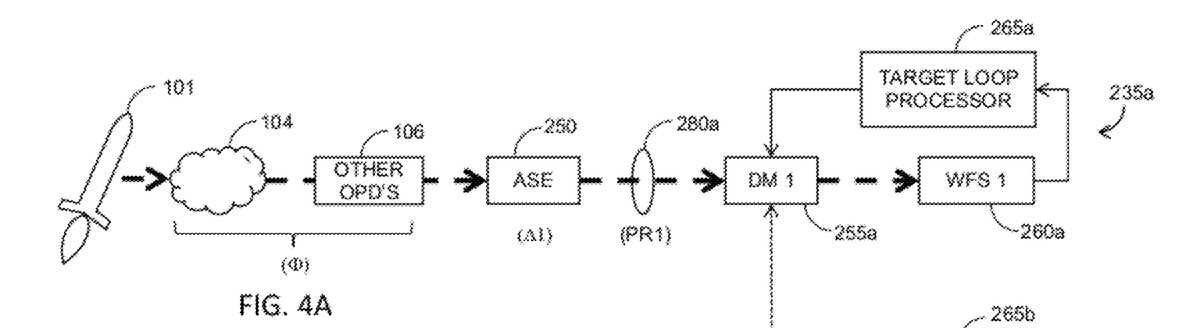
FIG. 4A is an optical schematic/block diagram illustrating an embodiment of the target adaptive-optics servo loop illustrated in FIG. 3.
Figure 4B:
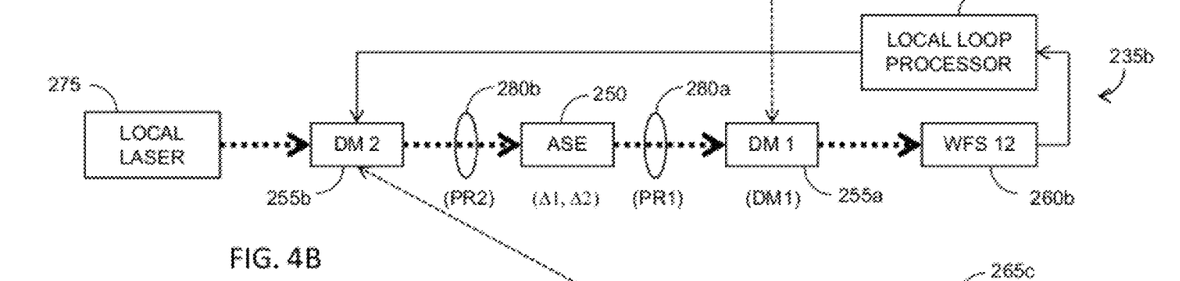
FIG. 4B is an optical schematic/block diagram illustrating an embodiment of the local source adaptive-optics servo loop illustrated in FIG. 3.
Figure 4C:
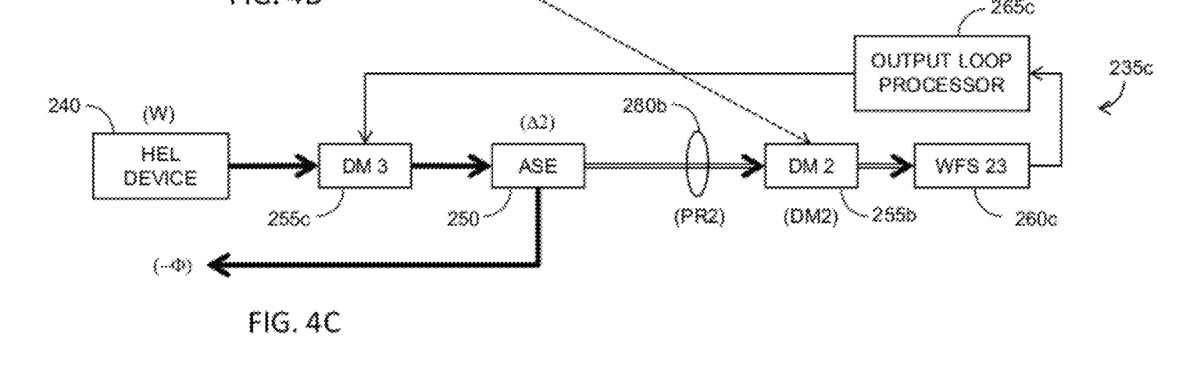
FIG. 4C is an optical schematic/block diagram illustrating an embodiment of the high-energy source adaptive-optics servo loop illustrated in FIG. 3.

As described above, the beam control system 230 includes at least three adaptive optics (AO) servo loops. Referring to FIG. 4A, a first AO servo loop 235a is closed on the first deformable mirror 255a according to the return target energy. Referring next to FIG. 4B, a second AO servo loop 235b is closed on the second deformable mirror 255b according to an output the local loop laser 275. Referring next to FIG. 4C, a third AO servo loop 235c is closed on the third deformable mirror 255c according to the output of the high-energy source 240. FIGS. 4A through 4C respectively illustrate the AO servo loops 235a, 235b, 235c in a schematic fashion, including those respective components from FIG. 3 that interact or otherwise contribute to each of the AO servo loop. Illustrated in parentheses next to some of the loop components are variables representing respective contributions to wavefront aberrations.

Referring to FIG. 4A, the first AO servo loop 235a (i.e., the target loop) receives illumination from an illumination source (not shown) reflected off of the target 101 and returned to the beam control system 130 through the atmosphere. The return target energy wavefront is perturbed by atmospheric and other external disturbances as described above, encountered along a path from the target to the beam control system 230. The perturbations result in wavefront aberrations that can be represented by the quantity ($\Phi$). The return target energy received at the beam control system 230 passes through the ASE 250, with the wavefront acquiring further aberrations during refracted through the ASE 250, such aberrations represented by ($\Delta 1$). The refracted, return target energy passes through first pupil relay optics 280a, with the wavefront acquiring further aberrations represented by (PR1). The resulting target energy with all of the aberrations just described (i.e., $\Phi$, $\Delta 1$, PR1) is incident upon the first deformable mirror 255a, which by its deformations produces further aberrations represented by (DM1).

Target return energy is reflected from the first deformable mirror 255a to the target-loop wavefront sensing element 260a. The target-loop wavefront sensing element 260a provides an error signal to the target-loop adaptive optics processor 265a, indicative of the departure of the target return energy from plane wave (i.e., aberrations) at the first deformable mirror 255a. As described above, the target-loop adaptive optics processor 265a implements a null-seeking servo algorithm, producing a corrective control signal forwarded to the first deformable mirror 255a. When the first AO servo loop 235a is closed, perturbations of the deformable mirror DM1 are equivalent to a conjugate of a combination of the atmospheric 104 and other external aberrations 106, collectively represented by ($\Phi$) combined with other wavefront perturbations incurred by the return target energy along its course within the beam control system 230 (i.e., $\Delta 1$ and PR1). As set forth mathematically in Table 1 below, the correction applied to the first deformable mirror 255a can be represented by DM1=$-\Phi-\Delta 1$-PR1.

Referring to FIG. 4B, the second AO servo loop 235b (i.e., the local loop) receives illumination from a local-loop laser 275. The local-loop laser illumination is reflected off of the second deformable mirror 255b, which by its deformations produces aberrations represented by (DM2). The local laser illumination next passes through second pupil relay optics 280b, with the wavefront being further perturbed during transit therethrough, such perturbations represented by (PR2). The local-loop laser illumination is reflected from the second deformable mirror 255b and refracts through the ASE 250 in a vertical, with the wavefront acquiring aberrations during refraction through the ASE 250, such aberrations represented by ($\Delta 2$). The local laser illumination is also reflected from a rear surface of a reflective surface of the ASE 250, further acquiring aberrations during refraction through the ASE 250 in a horizontal direction, such aberrations represented by ($\Delta 1$). The local laser illumination next passes through first pupil relay optics 280a, with the wavefront acquiring still further aberrations during transit therethrough, such aberrations represented by (PR1). The resulting target energy with all of the aberrations just described (i.e., DM2, $\Delta 1$, $\Delta 2$, PR1, PR2) is incident upon the first deformable mirror 255a, which by its deformations produces further aberrations represented by (DM1).

Light is reflected from the first deformable mirror 255a to the second wavefront sensing element 260b. The second wavefront sensing element 260b provides an error signal to the local loop adaptive optics processor 265b, indicative of the departure of the illumination from the local laser 275 from plane wave. The local loop adaptive optics processor 265b also implements a null-seeking servo algorithm, producing a corrective control signal forwarded to the second deformable mirror 255b. When the second AO servo loop 235b is closed, perturbations of the second deformable mirror DM2 are equivalent to a conjugate of a combination of the other wavefront perturbations encountered by illumination of the local laser 275 from plane wave as it propagates through the second servo loop 235b. As set forth mathematically in Table 1 below, $DM2 = -PR2 + \Phi - \Delta 2$.

Referring to FIG. 4C, the third AO servo loop 235c (i.e., the output loop) receives illumination from the high-energy electromagnetic radiation source (e.g., HEL) 240. The HEL high-energy output beam is reflected off of the third, high-power deformable mirror 255c, with the wavefront encountering perturbations from the third mirror represented by DM3. A high-power portion of the HEL high-energy output beam is reflected from the ASE 250. A low-power portion of HEL high-energy output beam is allowed to pass through the reflective surface of the ASE 250, the low-power portion also being perturbed during refraction in a vertical direction through the ASE 250, such perturbations represented by ($\Delta 2$). The low-power output beam next passes through the second pupil relay optics 280b, with the wavefront being further perturbed during transit therethrough, such perturbations represented by (PR2). The resulting low-power output beam with all of the perturbations just described (i.e., DM3, $\Delta 2$, PR2) is incident upon the second deformable mirror 255a and perturbed by reflection thereon, such perturbation represented by (DM2).

Light is reflected from the second deformable mirror 255b to the third wavefront sensing element 260c. The third wavefront sensing element 260c provides an error signal to the output loop adaptive optics processor 265c, indicative of the departure of the illumination from the low-power output beam from plane wave. The output loop adaptive optics processor 265c similarly implements a null-seeking servo algorithm, producing a corrective control signal forwarded to the third deformable mirror 255c. When the third AO servo loop 235c is closed, perturbations of the third deformable mirror DM3 are equivalent to a conjugate of a combination of the other wavefront perturbations encountered by illumination of the low-power output beam from plane wave is it propagates through the third servo loop 235c. As set forth mathematically in Table 1 below, $DM3 = -\Phi - W$.

Mathematically, this correction is summarized in equation form in Table 1, in which all uncommon path aberrations are self-compensated. Note that all optics and sensors of the beam control system 230 shown in FIGS. 3 and 4A-C are provided on the low-power side of the ASE 250, except for the high-power deformable mirror 255c.

TABLE 1

Loop-Nulling Analysis

| | |
|---|---|
| First (target) loop nulled: | $DM1 + \Phi + \Delta 1 + PR1 = 0$ <br> $DM1 = -\Phi - \Delta 1 - PR1$ |
| Second (local) loop nulled: | $DM2 + PR2 + \Delta 2 + \Delta 1 + PR1 + DM1 = 0$ <br> $DM2 + PR2 + \Delta 2 + \Delta 1 + PR1 + (-\Phi - \Delta 1 - PR1) = 0$ <br> $DM2 = -PR2 + \Phi - \Delta 2$ |
| Third (output) loop nulled: | $DM2 + PR2 + \Delta 2 + W + DM3 = 0$ <br> $(-PR2 + \Phi - \Delta 2) + PR2 + \Delta 2 + W + DM3 = 0$ <br> $DM3 = -\Phi - W$ |
| Final High-Energy Output: | $DM3 + W = -\Phi - W + W$ <br> $DM3 + W = -\Phi$ |

Preferably, operation of the AO servo loops 235a, 235b, 235c is accomplished such that pre-compensation of the high-energy output as described herein can be accomplished in real time, allowing the beam control system 230 to maintain sufficient pre-compensation during variation of one or more wavefront perturbing factors. For example, variations to atmospheric and other external perturbations can occur on the order of milliseconds. Accordingly, operation of the AO servo loop 235a, 235b, 235c would be accomplished on a similar time scale or faster. Additionally, in some embodiments, loop response time of the AO servo loop 235a, 235b, 235c are arranged in a preferred order. For example, a loop response time of the first AO servo loop 235a is shorter than a loop response time of the second AO servo loop 235b, which, in turn, is shorter than the loop response time of the third AO servo loop 235c. Such relative timing between the different AO servo loops 235 ensures that the first servo loop 235a is "closed" such that the surface of the first deformable mirror 255a is set to a value of DM1 as described in Table 1, before the second servo loop 235b closes, setting that the surface of the second deformable mirror 255b as also described in Table 1. Likewise, the second servo loop 235b is "closed" such that the surface of the second deformable mirror 255b is set to a value of DM2 as described in Table 1, before the third servo loop 235c closes, setting that the surface of the third deformable mirror 255c as also described in Table 1.

Anticipated latency problems associated with nested AO servo loops, such as those described in the illustrative embodiments, can be minimized with an optimized control algorithm taking advantage of feed-forward deformable mirror settings. The main atmospheric and other external aberrations ($\Phi$) can be first conjugated (i.e., $-\Phi$) in the first loop, anti-conjugated (i.e., $\Phi$) in the second loop, then conjugated again (i.e., $-\Phi$) in the third loop. Once the first loop has been closed, the value of is known, and can be electronically anticipated for in the other loops. This is referred to generally as a feed-forward algorithm based on prior knowledge of $\Phi$ obtained from the first loop.

In at least some applications, OPD's introduced by the HEL 240 and elements of the beam control system 230 are relatively static, at least when compared to OPD variations resulting from atmospheric and other external disturbances (i.e., $\Phi$). Consequently, closure of one or more of the AO servo loops 235 can be accomplished more expediently once static OPD's of other system elements have been determined. For example, the servo loops 235 effectively have a "head start" knowing at least part of the solution resulting from the relatively static terms. Thus, the one or more servo loops 235 can be "closed" more quickly using predictive algorithms responsive to updated measurement of $\Phi$.

In at least some embodiments, one or more of the second and third adaptive optics servo loops 235b, 235c can be disabled or even eliminated from the beam control system 230. Taking advantage of the relatively static nature of the other OPD's described above, updated control signal for one or more of the second or third deformable mirrors can be determined without having to close the respective servo loop. For example, once the surface of DM1 255a has been adjusted to compensate for updated atmospheric and other external disturbances (Φ), the control signal for the second and third mirrors can be determined mathematically. Namely, the control signal for DM2 255*b* can be adjusted to induce a surface distortion corresponding to Φ−Δ2−PR2, without the need of "closing" the local servo loop in the traditional sense. Likewise, the control signal for DM3 255*c* can be adjusted to induce a surface distortion corresponding to −Φ−W, again without the need of "closing" the output servo loop in the traditional sense. It is important to recognize that despite any advantages offered by such feed-forward techniques, the null-seeking nested servo loop architecture remains a desirable alternative due to its simplicity, reliability and precision.

Thus, the order for closing the three AO servo loops 235 need not be limited to: (i) target loop 235*a*, then (ii) local loop 235*b*, then (iii) output loop 235*c*. For example, the local and output loops 235*b*, 235*c* can follow the target loop 235 almost immediately.

By combined action of the respective feedback loops, the high-energy output of the HEL device 240, which includes wavefront aberrations W, when subject to reflection from the third, high-power deformable mirror 255*c*, pre-compensates the output beam, such that the output includes a conjugation of the atmospheric and other external aberrations. Beneficially, the beam control system 230 is able to work without consideration for a particular high-power source of electromagnetic energy. The beam control system 230 is configured to sample aberrations of the HEL device (W) compensating for such aberrations in the ultimate high-energy output beam.

Figure 5:
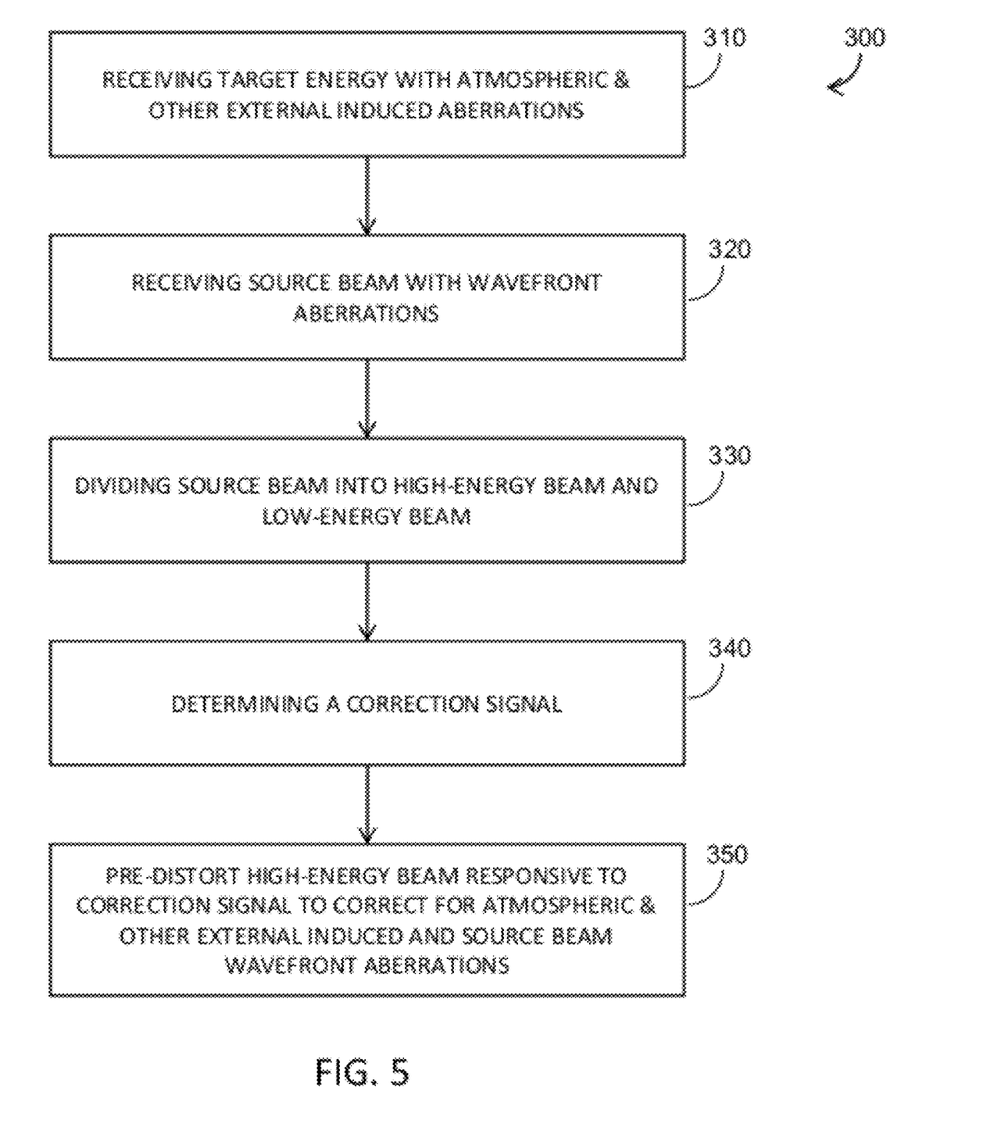
FIG. 5 is a simplified flow diagram of a process for controlling a beam of electromagnetic energy in accordance with an illustrative embodiment of the present invention.

FIG. 5 is a simplified flow diagram of a process 300 for controlling a beam of electromagnetic energy in accordance with an illustrative embodiment of the present invention. In a first step (300), target energy is received including atmospheric and other external-induced aberrations. A high-power electromagnetic energy source is also received at step 320, including wavefront aberrations related to the source. The source beam is divided at step 330 into a high-energy beam and a low-energy beam. A correction signal is determined at step 340 and applied to the high-energy beam at step 350 to correct for atmospheric and other external-induced and source beam wavefront aberrations.

Although the description focuses on a particular example in which particular components and configurations are employed in construction and operation of the closed-loop AO processors, alternative embodiments of AO processors using different elements and different combinations of elements are possible. For example, one or more of the deformable mirrors may be replaced with another element capable of adjusting a wavefront of electromagnetic energy, such as an opto-modulator or other transmissive device.

Although the present invention has been described in detail, it should be understood that various changes, substitutions and alterations can be made hereto without departing from the sphere and scope of the invention as defined by the appended claims.

What is claimed is:

1. A beam control system, comprising:
   a first adaptive optics servo loop positioned to receive a high-energy beam of electromagnetic energy, the first adaptive optics servo loop introducing a first internal optical-path-difference error;
   a second adaptive optics servo loop positioned to receive electromagnetic energy from a target, the received electromagnetic energy comprising wavefront aberrations related to atmospheric and other external disturbances, the second adaptive optics servo loop introducing a second internal optical-path-difference error;
   an aperture-sharing element positioned in a respective optical path of each of the first and second adaptive optics servo loops, the aperture sharing element contributing different optical-path-difference errors to each of the first and second internal optical-path-difference errors, and adapted to (i) obtain a low-energy beam sample of the high-energy beam and (ii) outcouple the high-energy beam; and
   a third adaptive optics servo loop arranged in electromagnetic communication with each of the first and second adaptive optics servo loops, the arrangement of servo loops adapted to self-cancel substantially all internal optical-path-difference errors in the outcoupled high-energy beam and to pre-compensate the outcoupled high-energy beam according to a conjugate of the wavefront aberrations related to atmospheric and other external disturbances.

2. The beam control system of claim 1, wherein each of the first, second and third closed-loop adaptive optics servo loops respectively comprises:
   a wavefront aberration sensor;
   an adaptive optics processor in communication with the wavefront aberration sensor; and
   a wavefront aberration-correcting element in communication with the adaptive optics processor, whereby each respective wavefront aberration sensor is adapted to provide an error signal responsive to aberrations of a respectively received wavefront, each respective adaptive optics processor is adapted to provide a correction signal in response to the respective error signal, and each respective wavefront aberration-correction element is adapted to adjust the respective received wavefront in response to the correction signal such that respective wavefront aberrations are substantially removed.

3. The beam control system of claim 2, wherein each respective wavefront aberration sensor is individually selected from the group consisting of: phase derivative sensors, such as Shack-Hartmann wavefront sensors; wavefront curvature sensors; interferometers, such as shearing interferometers; phase second derivative sensors, such as pyramid wave front sensors; and hybrid sensors including any of the aforementioned sensors in conjunction with power-in-the bucket control.

4. The beam control system of claim 2, wherein at least one of the respective wavefront aberration-correcting elements comprises a deformable reflecting surface.

5. The beam control system of claim 2, wherein two of the respective wavefront aberration-correcting elements are disposed in low-power ones of the first, second, and third adaptive optics servo loops.

6. The beam control system of claim 2, wherein at least one of the respective wavefront aberration-correcting elements comprises a transmissive phase-modulating element.

7. The beam control system of claim 1, wherein the aperture-sharing element comprises at least one reflective surface.

8. The beam control system of claim 7, wherein the aperture-sharing element is adapted to reflect the high-energy beam and transmit the low-energy sample.

9. The beam control system of claim 1, wherein the high-energy beam and the low-energy beam differ by a factor of at least about $10^3$.

10. The beam control system of claim 1, further comprising a telescope positioned along an optical path between the aperture-sharing element and the target, the telescope configured to focus the outcoupled high-energy beam onto the target.

11. The beam control system of claim 10, further comprising:
- at least one course steering gimbal adapted to steer the telescope;
- at least one fast-steering mirror positioned between the aperture-sharing element and the telescope; and
- a target tracking servo loop in communication with the at least one fast-steering mirror, the tracking servo loop processor adapted to receive a portion of the electromagnetic energy received from the target and, in response thereto, provide a tracking signal responsive to movement of the target, the tracking signal adapted to adjust the at least one fast-steering mirror to maintain focus of the high-energy beam onto the target despite relative movement between the target and the beam control system.

12. The beam control system of claim 1, wherein the high-energy beam of electromagnetic energy comprises a high-energy laser beam.

13. The beam control system of claim 1, wherein the first adaptive optics servo loop comprises a high-power deformable mirror.

14. The beam control system of claim 1, wherein the third adaptive optics servo loop comprises a low-power laser.

15. A method for pre-compensating a high-energy beam, comprising:
- receiving from a source, a high-energy beam of electromagnetic energy;
- receiving from a target, electromagnetic energy comprising wavefront aberrations related to atmospheric and other external disturbances encountered along a distance separating the target;
- determining by adaptive optics techniques a correction signal responsive to the high-energy beam and electromagnetic energy received from the target, the correction signal configured to pre-compensate for wavefront aberrations related to the atmospheric and other external disturbances and to cancel aberrations introduced by the adaptive optics techniques;
- adjusting a wavefront of the high-energy beam of electromagnetic energy responsive to the determined correction signal; and
- outcoupling the wavefront-adjusted high-energy beam.

16. The method of claim 15, further comprising:
- sampling a portion of electromagnetic energy received from the target;
- determining from the sampled portion, a tracking signal responsive to movement of the target;
- steering the wavefront-adjusted, high-energy beam responsive to the determined tracking signal, such that the wavefront-adjusted, high-energy beam tracks movement of the target.

17. The method of claim 15, further comprising focusing the wavefront-adjusted, high-energy beam onto the target.

18. The method of claim 15, wherein adjusting the wavefront of the high-energy beam comprises:
- adjusting deformable reflecting surface responsive to the determined correction signal; and
- reflecting upon the adjusted deformable reflecting surface, the high-energy beam of electromagnetic energy received from the source.

19. The method of claim 15, wherein determining the correction signal comprises using a plurality of overlapping adaptive optics servo loops.

20. The method of claim 15, wherein determination of the correction signal and adjustment of the wavefront of the high-energy beam are accomplished dynamically.

21. A beam control system, comprising:
- means for receiving from a source, a high-energy beam of electromagnetic energy;
- means for receiving from a target, electromagnetic energy comprising wavefront aberrations related to atmospheric and other external disturbances encountered along a distance separating the target;
- means for determining by adaptive optics techniques a correction signal responsive to the high-energy beam and electromagnetic energy received from the target, the correction signal configured to pre-compensate for wavefront aberrations related to the atmospheric and other external disturbances and to cancel aberrations introduced by the adaptive optics techniques;
- means for adjusting a wavefront of the high-energy beam of electromagnetic energy responsive to the determined correction signal; and
- means for outcoupling the wavefront-adjusted high-energy beam.

* * * * *